United States Patent
Jokerst, Sr.

(10) Patent No.: US 6,865,476 B1
(45) Date of Patent: Mar. 8, 2005

(54) NAUTICAL WAYPOINTS AND ROUTES DATA SETS

(76) Inventor: John B. Jokerst, Sr., 549 Madrid Blvd., Punta Gorda, FL (US) 33950

( * ) Notice: Subject to any disclaimer, the term of this patent is extended or adjusted under 35 U.S.C. 154(b) by 0 days.

(21) Appl. No.: 10/365,048

(22) Filed: Feb. 12, 2003

(51) Int. Cl.[7] .............................................. G01C 21/00

(52) U.S. Cl. ....................................... 701/206; 701/200

(58) Field of Search ................................. 701/206, 207, 701/213, 214, 224; 342/357.01, 357.06

(56) References Cited

U.S. PATENT DOCUMENTS 6,321,158 B1 * 11/2001 DeLorme et al. ........... 701/201

* cited by examiner

Primary Examiner—Yonel Beaulieu
(74) Attorney, Agent, or Firm—Frank A. Lukasik

(57) ABSTRACT

A system for calculating waypoints and routes for marine navigation by pre-calculating the routes and waypoints, saving the results to databases contained within electronic media such as CD ROMs, floppy discs, and disseminating copies to mariners for use with prior art global positioning systems devices in common use in the marine industry. The mariner is enabled to send the information on a disc for use on other global positioning systems devices and to superimpose uniquely named waypoints and routes, which contain additional fields and features not found in prior art systems.

2 Claims, 5 Drawing Sheets

The information below is presented as an aid to navigation. It is not intended to replace the use of charts but to be used in conjunction with appropriate charts, compass, depth finder and other aids as appropriate. No data can replace good seamanship. Prudent Captains always check the current "Notice to Local Mariners" for any changes. The Captain is responsible for the safety of his/her vessel at all times.
WAYPOINTS HAVE BEEN CROSS-REFERENCED TO THE FOLLOWING CHARTS AND GARMIN MAPSOURCE
United States Waterways & Lights and BlueChart Region 11
WATERPROOF CHARTS:

Chart No.1 - United States of America NAUTICAL CHART symbols, abbr., & terms (USED WITH ALL CHARTS)
01E - Charlotte Harbor and Pine Island Sound
24E - Boca Grande to Osprey and Lemon Bay
25E - Barrier Islands, Boca Grande to Estero Bay

| Charts | Waypoint Name | Description | Position | Latitude/Longitude |
|---|---|---|---|---|
| 01E | ALGR01 | FL G 6S | Alligator Creek Lt. 1 | N26 52.595 W82 04.093 |
| 01E,25E | CHS05 | FL G 4S | Cape Haze Shl Lt 5 | N26 45.703 W82 07.977 |
| 01E,25E | GICW02 | TR-TY ON PILE | Gasparilla Snd Ch Dbn 2 | N26 44.764 W82 14.871 |
| 01E,25E | GICW08 | FL R 4S | Gasparilla Snd Ch Lt 8 | N26 46.541 W82 14.639 |
| 01E,25E | GICW13 | FL G 4S | Gasparilla Snd Ch Lt 13 | N26 47.987 W82 15.262 |
| 01E,25E | GICW20 | FL G 4S | Gasparilla Snd Ch Lt 20 | N26 49.513 W82 15.882 |
| 24E | GICW23 | FL R 4S | Gasparilla Snd Ch Lt 23 | N26 49.672 W82 16.391 |
| 24E | GICW26 | FL R 4S | Gasparilla Snd Ch Lt 26 | N26 50.345 W82 16.785 |
| 24E | GICW29 | FL G 4S | Gasparilla Snd Ch Lt 29 | N26 50.497 W82 17.196 |
| 24E | GICW33 | FL G 4S | Gasparilla Snd Ch Lt 33 | N26 50.852 W82 17.596 |
| 24E | LICW03 | FL G 4S | Lemon Bay Ch Lt 3 | N26 51.147 W82 18.093 |
| 24E | LICW11 | FL G 4S | Lemon Bay Ch Lt 11 | N26 53.083 W82 19.330 |
| 24E | LICW14 | FL R 4S | Lemon Bay Ch Lt 14 | N26 53.639 W82 19.339 |
| 24E | LIC17A | SG-SY ON PILE | Lemon Bay Ch Dbn 17a | N26 54.333 W82 19.882 |
| 24E | LICW22 | FL R 2.5S | Lemon Bay Ch Lt 22 | N26 55.838 W82 21.007 |
| 01E | S-REEF | NW ON PILE. ART. REEF | South end of fishing reef | N26 50.499 W82 05.277 |

Fig. 2A

The information below is presented as an aid to navigation. It is not intended to replace the use of charts but to be used in conjunction with appropriate charts, compass, depth finder and other aids as appropriate. No data can replace good seamanship. Prudent Captains always check the current "Notice to Local Mariners" for any changes. The Captain is responsible for the safety of his/her vessel at all times.
WAYPOINTS HAVE BEEN CROSS-REFERENCED TO THE FOLLOWING CHARTS AND GARMIN MAPSOURCE
United States Waterways & Lights and BlueChart Region 11
WATERPROOF CHARTS:
Chart No.1 - United States of America NAUTICAL CHART symbols, abbr.. & terms (USED WITH ALL CHARTS)
O1E - Charlotte Harbor and Pine Island Sound
24E - Boca Grande to Osprey and Lemon Bay
25E - Barrier Islands, Boca Grande to Estero Bay
Route      ALGR01 to LICW22   31.1 mi                16 waypoints
CAUTION;  DUE NOT ATTEMPT TO PASS CHS05 TO THE NORTH OF ITS LOCATION.
THE DEPTH BECOMES VERY SHALLOW VERY QUICKLY

| Header | Waypoint Name | Distance | Leg Length | Course |
|---|---|---|---|---|
| Route Waypoint | ALGR01 | 0 ft | | |
| Route Waypoint | S-REEF | 2.71 mi | 2.71 mi | 207° true |
| Route Waypoint | CHS05 | 8.89 mi | 6.19 mi | 207° true |
| Route Waypoint | GICW02 | 16.1 mi | 7.18 mi | 261° true |
| Route Waypoint | GICW08 | 18.1 mi | 2.06 mi | 7° true |
| Route Waypoint | GICW13 | 19.9 mi | 1.79 mi | 339° true |
| Route Waypoint | GICW20 | 21.8 mi | 1.87 mi | 340° true |
| Route Waypoint | GICW23 | 22.3 mi | 0.555 mi | 289° true |
| Route Waypoint | GICW26 | 23.2 mi | 0.875 mi | 332° true |
| Route Waypoint | GICW29 | 23.7 mi | 0.458 mi | 292° true |
| Route Waypoint | GICW33 | 24.3 mi | 0.580 mi | 315° true |
| Route Waypoint | LICW03 | 24.9 mi | 0.614 mi | 304° true |
| Route Waypoint | LICW11 | 27.4 mi | 2.57 mi | 330° true |
| Route Waypoint | LICW14 | 28.1 mi | 0.641 mi | 359° true |
| Route Waypoint | LIC17A | 29.1 mi | 0.975 mi | 325° true |
| Route Waypoint | LICW22 | 31.1 mi | 2.09 mi | 326° true |

Fig. 2B

NAUTICAL WAYPOINTS AND ROUTES DATA SETS

FIELD OF INVENTION

This invention relates generally to devices and methods for calculating waypoints and routes for marine navigation and more particularly, to the pre-calculation of routes and waypoints, saving the results to databases and contained within electronic media and disseminating copies to mariners for use with prior art global positioning devices in common use in the marine industry.

With the advent of electronic navigation devices using global positioning satellites, marine navigation has become safer and with GPS system becoming more affordable, compact Nav Stations have become commonplace among commercial and recreational boaters.

Prior art GPS systems such as those manufactured by GARMIN are small units having a screen and various controls for connecting the device and controlling it. Inputting data into the device is accomplished by the use of toggle switches usually manipulated by the thumb. Moving the toggles presents various screen options for inputting data, the use of the thumb to activate these screens could be termed "thumbing". Thumbing is an effective but sometimes laborious way to enter the data especially if complicated data is entered when even slight errors can prove disastrous to safe navigation Prior art GPS systems have not provided a method to easily print out data. There are many software programs available that will provide the user with a "trip ticket" from point "A" to point "B" with a detailed printout of miles per day, quickest route, shortest route and points of interest along the way, all based upon initial input by the user. These programs also provide map printouts highlighting the route and showing a localized snapshot of topographical maps. They are informative and easy to follow but are useful only for automobile travel there is no equivalent system for marine use utilizing marine charts.

Marine navigation consists of plotting safe passages between known locations. Various directional adjustments are made to conform with a pre-calculated route, these adjustments are made at "waypoints". GPS units can be pre-programmed with route information and they will facilitate the vessel's conformity to the route plan by giving course headings for the waypoints along the way. The vessel operator refers to the GPS screen as the vessel makes way and steers at various compass headings as signified by the GPS unit. If the vessel operator uses the "highway page" of the GPS, a highway or road is displayed on the GPS screen. If the vessel operator steers the vessel down the centerline of the road, the vessel remains on course headed to the next waypoint. By observing the road and staying on the centerline, the operator is continually making small steering corrections that are necessary due to various external conditions such as: wind, current, wave action, tide surges, shoaling of spoil into the channel, the physical placement of the aid to navigation by the installers and the ability of a floating aid to traverse around the chain that holds it in place. As the vessel reaches the next waypoint, the highway changes direction and shows the way to the next waypoint. The determination of the Latitude and Longitude of the waypoints are critical in the development of routes which are derived from those once developed waypoints as shall be discussed in following paragraphs.

To prepare for a particular journey, the operator will consult charts covering the geographical area in which the route is to occur. Decisions as to the exact route are made according to the conditions in the area, the navigational aids available, the draft and other requirements of the vessel. The route is planned to provide for regular access to navigational aids and to provide the greatest margin of safety while giving the most direct route. The prudent operator will constantly check the latest "Local Notice to Mariners" for additional pertinent information. From the charts, the waypoints Latitude and Longitude have to be calculated using hand held dividers and going to the appropriate scale at the edges of the chart. The scales are shown in tenths of minutes. The dividers are then placed on the scales to obtain the Latitude and Longitude. This process takes skill in order to achieve accurate numbers and is prone the careless errors by even experienced navigators. Since the scale is laid out in tenths, the operator needs to interpolate between tenths to get the second place decimal number. Note: With the advent of Global Positioning Satellites, Latitude and Longitude can be measured to the third significant digit. Since one minute of Latitude equals one nautical mile (6076.1 feet), 0.001 minute equals six feet. Therefore by establishing waypoints to the third significant decimal, the accuracy of the waypoint (s) can be navigated to within six feet under ideal conditions. From the charts, courses are plotted showing waypoints at which course changes will occur, headings to each succeeding waypoint are written down. Prior to the advent of electronic GPS, a list of successive waypoints and headings, with much less accuracy, were sufficient to navigate a vessel using "dead reckoning", a skill which mariners continue to use in the event of catastrophic failure of their electronic aids.

Once a route has been calculated, the waypoints and routes are entered (thumbed) into the GPS unit. If the planned journey is over a large distance, there can be many waypoints each of which must be entered manually. The greater the number of waypoints, the greater the margin of error. GPS manufactures have created various interfacing systems which give access to the computing power of a laptop (or any other) computer. The connection of the GPS to a computer vastly expands the limited storage capacity of the GPS and enables the user to access electronic charts for plotting routes and creating waypoints and heading lists. The computer automatically determines the heading and distance to the next waypoint in that specific route. Once this is done, it is a simple matter to save the information to electronic media for future reference. Over time a user would accumulate databases of such information for a particular area and the need for continuous and laborious calculation would diminish. All such calculations of waypoints and routes would be necessary for each individual boater even though many would ply the exact same routes and waterways. Again the margin for potential course errors is increased exponentially by the fact that many hundreds or even thousands of boaters are forced to establish their own waypoints and routes etc. As each boater is forced to establish their own waypoints, they are also forced to give each waypoint its own name. With boaters plying the same routes and using the same waypoints, there will be different names for each waypoint based on the individual's preference/choice in selecting the name. As described in this process, a unique name is established for each waypoint that is understandable in its origin, and provides a common "language" that can be used between boaters when meeting in route or planning a cruise consisting of more than one boat.

As those skilled in the art are aware, database information is transferable between computers and, with the advent of large capacity storage media such as CD's, huge databases can be simply transferred and disseminated to others. In this way, one carefully compiled data set of waypoints and routes four given areas can be made broadly available to boaters new to the area or to those newly acquiring vessels or GPS equipment. Boating and/or yacht clubs could provide such data to members saving them from having to invent a name for each waypoint themselves or to establish routes individually. Such data could also be supplied to the boating public at large that will be taking an extended cruise into unfamiliar waters. The savings in time and increases in data accuracy would provide much benefit to boating communities and the boating public at large.

The present invention provides a compilation of waypoint and route data covering various geographical areas in database form for broad dissemination.

SUMMARY OF THE INVENTION

It is therefore, a principal objective of this invention to provide pre-compiled waypoint and mapping data for use with marine GPS systems.

It is a further objective of the invention to store waypoint and route data to electronic media for dissemination to end users.

It is a further objective of the invention to create database fields which correspond to common GPS systems using 6 digit acronyms and multiple data fields.

It is a further objective of the invention to produce a uniquely named list of waypoints, to produce multiple routes there from, to create word processor files and print-outs of the waypoint and route information.

It is a further objective of the invention to correlate route information with marine charts of the same area, including, but not limited to, electronic charts such as those produced by GARMIN—"Waterways and lights and BlueChart" to permit the user to plan a route using marine charts and to then download from the database of the invention all of the necessary uniquely named waypoints for that particular route and to save the cartography so produced as a composition showing the waypoints and routes in an electronic file such as that used in the GARMIN MapSource program.

A further objective of the invention is to enable mariners to superimpose uniquely named waypoints and routes over electronic charts such as GARMIN's BlueChart, without reference to other electronic charts such as "United States Waterways and Lights" which may eventually become unavailable.

The present invention teaches the need for additional fields and features not found in prior art systems as follows, Fields for "Charts", "Feature properties" (i.e. Warning information such as DO NOT USE AT LOW TIDE) "Remarks" and the ability to access "pop-up" windows for a given chart feature to dynamically interface with the GPS unit and add or delete information in the data base. Provide within the GPS system a simple printing method for outputting data either the electronic charts or the database such that simple nautical "trip tickets" can be produced to facilitate navigation of the vessel, while preservation of marine symbol terminology not featured in newer electronic charts—"red triangle", "red triangle with gold bar", "green square with gold bar" (Gold bar denotes inter coastal waterway).

The present invention teaches, for purposes of simplicity in printing nautical waypoint information the need for removal or optional truncation of data sets to disable unneeded fields from prior or current art data sets, namely Header, Type, Altitude, Depth, Proximity, Display Mode, Color, Symbol, Facility, City, State, Country, none of which fields are necessary in preparing nautical waypoint information.

Once the waypoint information has been established, a nautical trip ticket (route) can be established needing only fields for Name, Distance, Leg Length and Course and/or others as deemed appropriate.

Since the present invention provides electronic media containing pre-compiled data sets for given routes, a user need only load the media into a computer connected to a GPS device and download the data. This produces displays of distance between waypoints and true bearing between each point. True bearing is used to assist those who are unfamiliar with any deviations in their compass and, since true bearings are used for charting, those who prefer to chart courses on applicable navigation charts need no correction for variation or deviation in addition to using a GPS. The present invention provides printing capabilities allowing the user to produce hard copies of the data sets being used, providing thereby a backup data set in the event of power loss or failure of the GPS at which time dead reckoning can be used.

The present invention, in its current form defines the steps necessary for interaction with Garmin products. Reference is made in particular, to two electronic cartographic/chart programs, Garmin MapSource United States Waterways and Lights and Garmin Americas BlueChart. The invention's process becomes much more valuable in that Garmin Corporation is discontinuing Waterways and Lights and is only going to offer BlueChart in the future.

BlueChart cartography is reproduced/manufactured from NOAA charts, the same source as Waterproof Charts (which makes the information more accurate). BlueChart is a more accurate cartography than Waterways and Lights. The present invention process uses Waterways and Lights to establish (unique) names of waypoints, based on the geographic location of the aid and presents aid to navigation information in a more concise format consistent with Chart No. 1—United States of America NAUTICAL CHART symbols, abbr. & terms. BlueChart does not give information with respect to waypoint names, i.e. with respect to geographic location nor does it present aid to navigation information in as concise a form as Waterways and Lights. BlueChart is used in the present invention process to more accurately define the Lat/Long of each waypoint. In the future, the invention process will not be able to be duplicated due to the lack of source material (Waterways and Lights).

The present invention therefore seeks to preserve for posterity valuable features found in Waterways and Lights while using the Lat/Long accuracy of BlueChart. This integration of information provides waypoint and route overlays onto BlueChart cartography which are otherwise unavailable. It must be recognized that if the present invention were overlaid onto Waterways and Lights, there could/ would appear be misplacement of waypoints. This apparent misplacement only reflects the more accurate Lat/Long information obtained from BlueChart as described above.

The present invention teaches the navigational process with the following instruction set used by the inventor and performed on a standard, general purpose computer to create unique waypoints and thereafter-navigational routes.

PROCESS STEPS

1. Open (electronic map such as MapSource Waterways and Lights) untitled document
2. Move viewing area to area of interest 3. Reduce scale to show aids to navigation
4. Pick aid to navigation and center in screen
5. Place curser on aid to navigation and right click. Choose and click on "feature properties" to show the geographical noun nomenclature of that purposed waypoint. Write down that nomenclature and establish a six-digit acronym, to include the appropriate marker number. NOTE: A six-digit acronym is used to be compatible with the least versatile Garmin GPS. Example: Cape Haze Shoal Lt 5 becomes CHS05. Check CHS05 against previously established master list of waypoints to determine if that acronym has already been used. If so, determine another acronym for that waypoint.
6. Right click again on the aid to navigation and choose "new waypoint". In the pop up box for "name" type in CHS05.
7. Click OK in the pop up box and a new waypoint has been established.
8. Remove "Waterways and Lights" from D drive and insert BlueChart CD
9. On MapSource untitled document choose "Americas BlueChart" in order to change display to BlueChart cartography
10. Go to "Tools" and select "Selection". Center waypoint in screen and select zoom to 80 feet. Move curser to waypoint and left click. Move waypoint appropriate distance off of the pre-established cartographic aid to navigation that is a part of the MapSource software. Note: This step is necessary to assure that you have moved your waypoint to the "deep water" side of the aid to navigation. Such as: when running in narrow channels in "red right returning" or different rules when running in the Inter Coastal Waterway (ICW).
11. Repeat steps 1 through 10 to establish the number of waypoints you desire. Example. CHS05, PEAC01, PEAC02, PEAC03, PGORD2 and PICW76.

(Having completed steps 1–11 , waypoints have now been created and routes can now be established)

12. Still using Americas BlueChart. From Tool bar select Route Tool.
13. Start at PGORD2 and left click on above waypoints in the following order. PGORD2, PEAC03, PEAC02, PEAC01, CHS05 and PICW76. A route has now established with the name PGORD2 to PICW76. NOTE: At this time it is important to check the appropriate chart and/or cartography to verify that the route has not inadvertently been run across shallow water or run out of the channel. If so, addition waypoint (s) must be established to go around the shallow water or stay in the channel by using steps 1 through 11 above.
14. To add the additional waypoints, highlight the route, go to Edit, select Route properties and in the pop up box between the appropriate waypoints of that route, insert the additional waypoint (s) as necessary to make the route a SAFE route. When the route has been verified as being correct, click on OK.

Having created a route with a set number of waypoints, a hard copy printout must be created in order to record and understand the waypoints and the route. These printouts are created using the following steps.

15. In the File menu of the "untitled—MapSource BlueChart scroll down to Export and left click.
16. In the pop up window select the location as to where the document is to be saved. Example: "My Documents".
17. In the File name box select a file name. Example: FRANK
18. In the pop up box left click on Save. Minimize the untitled MapSource BlueChart.
19. Open "My documents" and open FRANK Text document.
20. FRANK will appear in a Notepad pop up window.
21. Minimize both the note pad and "My documents".
22. Open a Works/Word Spreadsheet.
23. Open a second Works/Word Spreadsheet.
24. Minimize 22 & 23
25. Maximize FRANK—Notepad.
26. Highlight all of the waypoints.
27. Under Edit select Copy and minimize the Notepad.
28. Maximize the first spreadsheet and in the Tool bar select Copy.
29. Delete the following columns from the Spreadsheet. Header, Type, Altitude, Depth, Proximity, Display Mode, Color, Symbol, Facility, City, State and Country by highlighting those columns, select Insert from the menu and click on Delete column.
30. Change "Position" to "Lat/Long".
31. Insert a new column and title it "Position".
32. Minimize the untitled spreadsheet.
33. Remove MapSource BlueChart CD from the computer and install MapSource Waterways and Lights.
34. Change untitled MapSource cartography, on the drop down box, to Waterways and Lights.—Continental US. Select the list of waypoints and select each waypoint in order. Go to each waypoint and on the zoom of 80 ft. go to the aid to navigation that the waypoint represents. Place the curser on the corresponding aid to navigation and right click.
35. Select Feature properties. Left click on the geographic location line and drag across the description to highlight it. Right click and select Copy. Click OK and minimize.
36. Maximize the first untitled spreadsheet and copy the position next to the appropriate waypoint.
37. Repeat steps 34, 35 and 36 for all of the waypoints.
38. Create a column to precede the "Name" column and title it "Charts".
39. Next to each waypoint, in the "Charts" column insert the appropriate Waterproof Chart number. Example: 01E, 25E
40. Insert any titles or notes as appropriate such as: Caution do not use at low tide.
41. Save the untitled spreadsheet to "My Documents" with a specific file name. Example: FWAYPTS.

(At this point a computer file has been saved showing all of the information pertaining to that set of waypoints).

To establish a computer file of routes:

42. Maximize FRANK—notepad.
43. Highlight all of the route(s).
44. Under Edit select Copy and minimize the Notepad.
45. Maximize the second untitled spreadsheet and in the Tool bar select Copy.
46. Click and drag each column until all wording in each column is exposed.
47. Insert any titles or notes as appropriate.
48. Save the untitled spreadsheet to "My Documents" with a specific file name. Example: FROUTES.
49. Print out FWAYPTS and FWAYPTS to create separate written copies of the waypoints and routes.
50. To save the MapSource cartography, maximize the untitled Cartographic map and "Save" using a file name such as FRANK.mps. The above steps, 1–50 comprise all of the steps used to create the present invention which consists of a unique cartographic MapSource document and Microsoft WINDOWS files that can be printed out to show all pertinent information relative to those waypoints and routes.

51. To load routes and waypoints into a (Garmin) GPS, open an untitled MapSource document.
52. From a Master MapSource file, Copy and Paste the appropriate Routes into the untitled MapSource file.
53. Connect the computer to a Garmin GPS using an interface cable.
54. Turn on the GPS and remove all current routes and waypoints.
55. From the untitled MapSource document select Save to device. A pop up window will appear.
56. If the GPS is not a chart plotter, check Waypoints and Routes. If it is a chart plotter select All. If the GPS uses Chips, select Waypoints and Routes.
57. Click on Save and the computer generated Charts, Routes and Waypoints in a matter of seconds/moments will be saved into your GPS.

New waypoints and routes can be uploaded into the computer using the remaining steps.

58. Connect the computer to a (Garmin) GPS using an interface cable.
59. Open an untitled MapSource document, select Open from device. A pop up window will appear.
60. Check Waypoints and Routes.
61. Click on Save and the GPS generated Routes and Waypoints will be saved into the computer.
62. If the GPS fails, turn on your backup battery powered hand held GPS.
63. In the event the backup GPS's batteries are dead, it will be possible to use the hard copies of the waypoints and routes in conjunction with the appropriate Waterproof Charts to establish a dead reckoning course to the next waypoint. Passage can be continued by establishing fixes and positions and using time speed and distance formulas to establish arrival times. By the use of TVMDC the course can be adjusted from true to compass. The depth finder and other aids to navigation would further facilitate safe passage.

SUMMARY OF THE DRAWINGS

FIG. 2A is a list of waypoints details as described in the present invention and superimposed on FIG. 2.

FIG. 2B is a printout of a route details as described in the present invention and superimposed on FIG. 2.

DETAILED DESCRIPTION OF A PREFERRED EMBODIMENT

Figure 1:
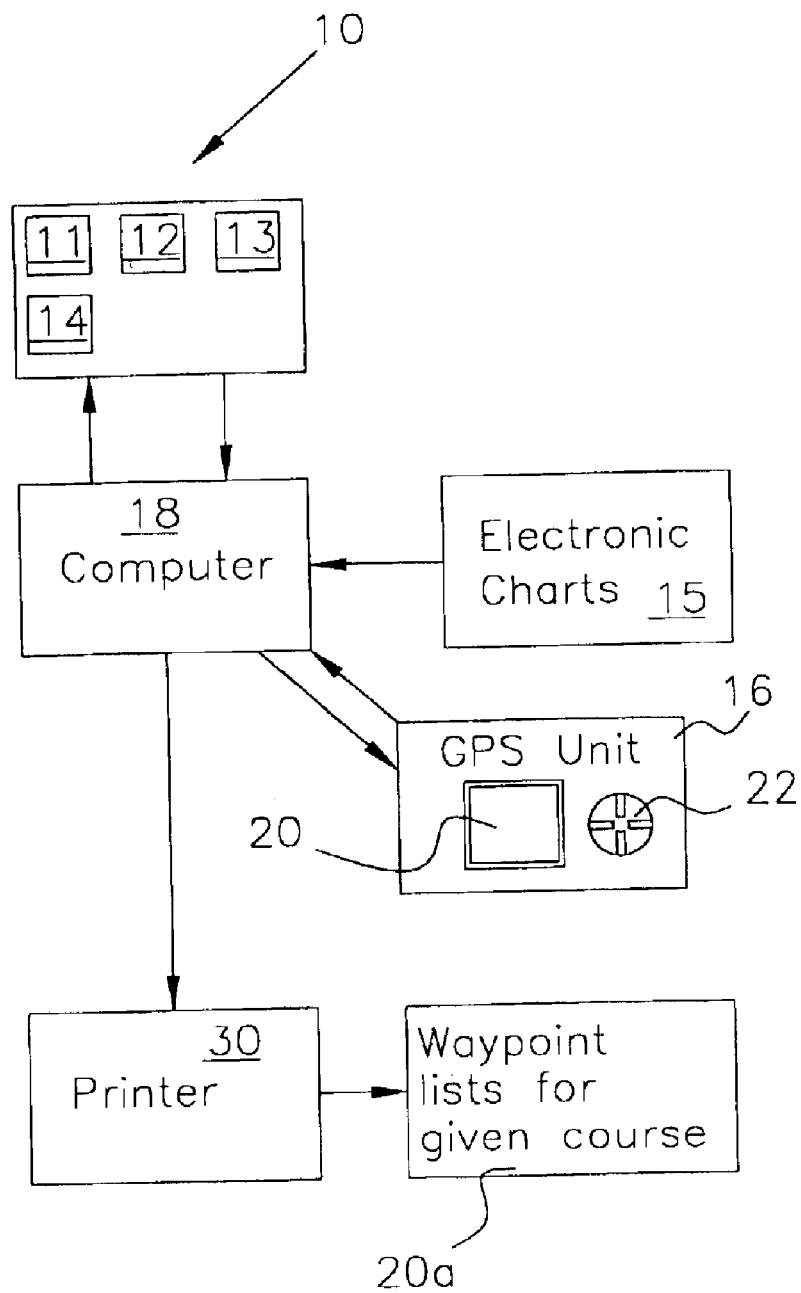
FIG. 1 is a flow chart showing the invention process and the components thereof.

Referring now to FIG. 1 wherein the invention method is designated overall by the numeral 10 11–4 are process steps involved in assembling the route data for inputting into computer 18 namely, data collection 11 concerning common routes used in given geographical areas (using electronic chart 15). Data sources include but are not limited to, anecdotal data from individual boaters, fishermen, boat/yacht clubs, marinas and municipal facilities. Testing route 12 found in 11 by comparing them to up-to-date charts of the area. Compiling waypoint lists for given routes 13. Inputting data 14 found in 13 into computer 18. Actual Example: 20a.

Waterproof Charts:
Chart No. 1—United States of America NAUTICAL CHART symbols,
abbrev. & terms. (USED WITH ALL CHARTS)
01E—Charlotte Harbor and Pine Island Sound
25E—Barrier Islands, Boca Grande to Estero Bay

| Header | Name | Length | Course | Waypoints |
|---|---|---|---|---|
| Route | PGORD2 to PICW76 | 21.7 mi waypoints | 213° true | 6 |

| Header | Waypoint Name | Distance | Leg Length | Course |
|---|---|---|---|---|
| Route Waypoint | PGORD2 | 0 ft | | |
| Route Waypoint | PEAC03 | 0.980 mi | 0.980 mi | 282° true |
| Route Waypoint | PEAC02 | 2.08 mi | 1.10 mi | 241° true |
| Route Waypoint | PEAC01 | 4.53 mi | 2.45 mi | 205° true |
| Route Waypoint | CHS05 | 14.1 mi | 9.56 mi | 185° true |
| Route Waypoint | PICW76 | 21.7 mi | 7.64 mi | 240° true |

Computer 18 connected to printer 30 produces printed data as illustrated above 20a. GPS unit 16 uses display screen 20 and input pad 22 to modify and display data input and output from computer 18.

Figure 2:
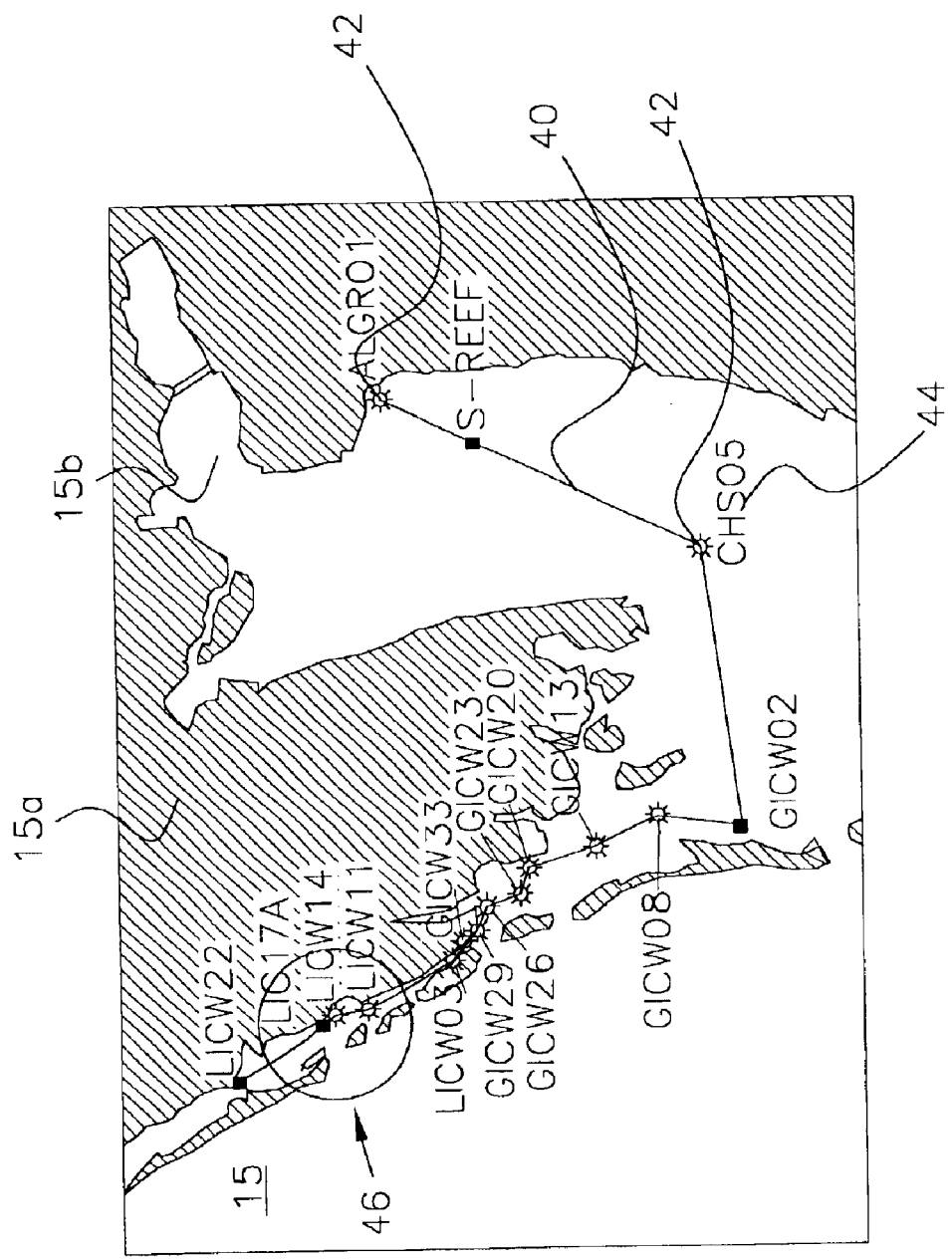
FIG. 2 is a schematic illustration of a typical electronic nautical chart with waypoints and a route superimposed.

In FIG. 2, Electronic chart 15 displays route 40 between multiple waypoints 42. Unique waypoint names 44 distinguish each waypoint.

Navigational symbols 46 (light) give mariners recognizable reference points. The land 15a is distinguished by an outline and waypoints 42 give safe passage along route 40. Waypoint names correspond to those included in the waypoint list shown in FIG. 2A. The list shown in FIG. 2B gives a route from ALGR01 (Alligator creek) out to LICW22 (Lemon Bay Ch Lt 22) on the Inter Coastal Waterway.

The present invention comprises, in part, a printout of the Master list of Waypoints. An excerpt of that Master list is shown in FIG. 2A. The top portion of FIG. 2A is composed of Warnings and reference information pertinent to the waypoints shown. The column labeled "Charts" shows the corresponding Waterproof Chart(s) where the specific waypoint may be found. The column labeled "Waypoint Name", shows the unique name of the waypoint and the waypoints are listed in alphabetical order. The column labeled "Description" refers to navigational aids and is copied from Waterways and Lights. For example, as used in Chart No. 1, FL G 4S indicates Flashing Green 4 Seconds. The column labeled "Position" is copied from Waterways and Lights showing the geographic location as well as identifying the logic/rational used in selecting a unique name for each waypoint. The column labeled "Latitude/Longitude" is copied from BlueChart. The process steps used to produce the printout are described in steps 1 through 11, 15 through 22 and 25 through 41 and 49 as shown in the PROCESS STEPS above.

Figure 3:
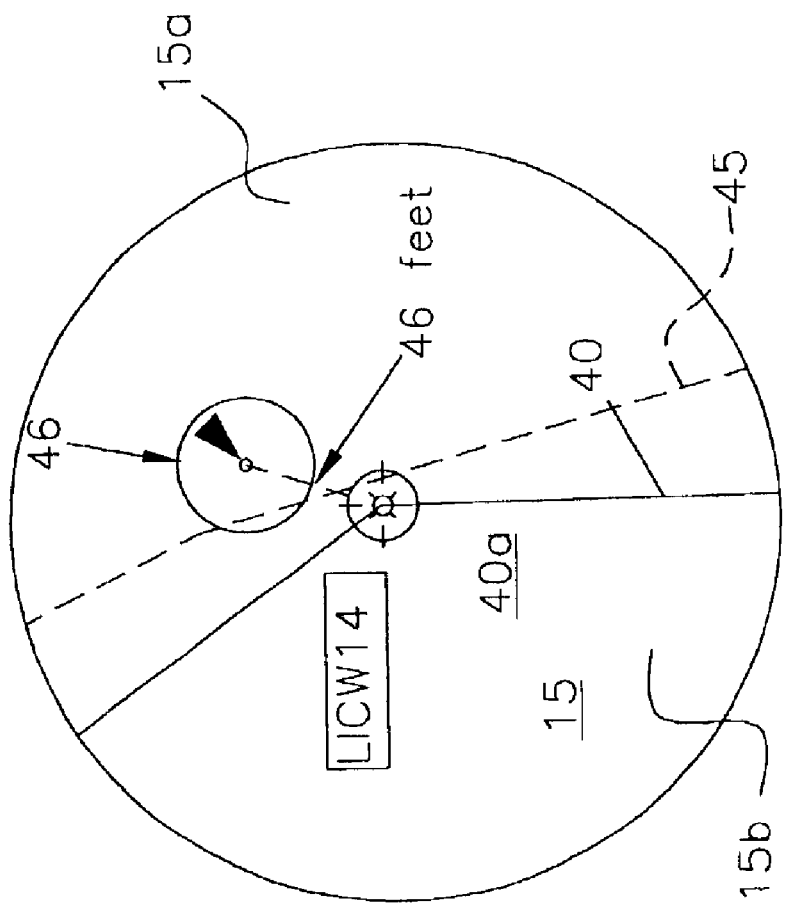
FIG. 3 is an enlargement of a section of FIG. 2 showing in more detail the route and waypoints of FIG. 2.

The present invention also comprises, in part, a route as shown in FIG. 2B, which is an excerpt of the Master Route list and is a route made from the waypoints identified in FIG. 2A. The process steps used to produce the printout are described in steps 12, 13, 14, 23, 24, 25, 42 through 48 and 49 as shown in the PROCESS STEPS above. This route has been correctly located by Lat/Long as shown in FIG. 3 to which reference is now made. Electronic chart 15 in its original form contains no waypoint data such as that associated with Light 46. It does provide the shore line 45 between land 15a and sea 15b. The present invention merges data concerning waypoints (from Waterways and Lights—

Continental US) with the much more accurate and detailed location of aids to navigation to include depths and depth contour lines of electronic chart 15 (BlueChart) and locates those waypoints along route 40. In FIG. 3, the waypoint for LICW14 (Lemon Bay Ch Lt 14, located on the Inter Coastal Waterway) is located on the deepwater side 40a, of route 40. By combining data showing the existence of light 46, with a safe water waypoint adjacent to said light, the invention improves the usefulness of chart 15 while providing the mariner with a route which passes a safe distance, 46 feet, from light 46.

It can be seen from the preferred embodiment described above that state of the art is enhanced and/or advanced in the following manner:

a. Manual entry of waypoints and routes are no longer necessary while minimizing the chances for transposition of Lat/Long digits.

b. Information composed with only that data the mariner needs.

c. Download into any GPS(s) with computer interface capability and purchase of GPS Manufacturer cartography software, preprogrammed waypoints and routes.

d. Waypoints uniquely and individually named with an acronym of 6 digits for those GPSs with only 6 digit entry capabilities.

e. Data cross referenced to Waterproof Charts for ease of manual charting.

f. Printouts provides all pertinent data for mariner to follow route by dead reckoning, if GPSs or electronic circuits fail.

g. Ability for the mariner to download those waypoints and routes that are frequently used within home waters without need for further entries.

h. Based upon the storage capacity of the mariner's GPS, the ability to download a predetermined list of waypoints and routes for an extended cruise.

i. Waypoint Lat/Long coordinates has been made with due care to assure safe passage on deep water side of the aid to navigation.

j. Since the predominant number of waypoints, used as turning points within given routes, are either lighted or sound producing aids to navigation, the mariner is able to proceed with caution during darkness or limited visibility to the next available safe anchorage, marina or home port.

k. Unique noun nomenclature of waypoints gives mariners, within a given geographic area, the ability to speak a common language when referring to waypoints.

l. Allows the mariner the ability to take a lap top computer aboard the vessel during extended cruises and if conditions change during the cruise, the mariner has the capability to download other/addition waypoints and routes into the GPS(s) from the Master list.

The above detailed description of the present invention is given for explanatory purposes. It will be apparent to those skilled in the art that numerous changes and modification can be made without departing from the scope of the invention. Accordingly, the whole of the foregoing description is to be construed in an illustrative and not a limitative sense, the scope the invention being defined solely by the appended claims.

In order to practice the invention, the mariner must have the applicable manufacturer's (such as Garmin MapSource), cartographic software and compatible software for spreadsheet and print out capabilities already installed on the computer, hard copies of the waypoints and routes may be used to input (thumb) the data manually into the computer.

What is claimed is:

1. A method for using a computer and a global positioning system device to facilitate the creation and dissemination of marine navigational waypoints and routes, said method comprising the steps of:

inputting into the computer, updateable waypoint data bases containing, electronic marine chart data, said data bases including, name, charts, description, position, latitude, and safety notes, said waypoints being designated by acronym, said waypoints being further designated by reference to a standardized reference to aids to navigation, geographic location and latitude and longitude with said waypoints designated to refer to preferred deep water positions, said waypoints being cross referenced to applicable hard copy charts, inputting into the computer data bases, compiled navigational routes, said data bases comprising successive waypoints derived in said waypoint data bases from a first waypoint to a last waypoint of a desired route, said data to be designated by, route waypoint, waypoint name, distance, leg length, in miles, course in true bearing, and specific route data, including shallow water, bridge heights, warnings and reference information pertinent to the waypoints shown, inputting data from the computer into said global positioning system device, inputting into the computer, data from said global positioning system device creating thereby a transfer of compiled route data between the computer and said global positioning system device, modifying said navigational routes using the computer and said global positioning system device, thereby updating said routes to include current conditions relevant to each of said waypoints, modifying data sets in the computer to make correct reference to said marine charts, and truncating said data sets to facilitate printing reports suitable for manual use in the event of failure of said global positioning system device or computer.

2. A product of the process of claim 1, said product comprising a data set for using a computer and a global positioning system device, said data set consisting of:

data output from the computer, said data being recorded on electronic media, said data set being input into other computers, said data set being thereafter input into other global positioning system devices.

* * * * *